United States Patent [19]

Harris et al.

[11] Patent Number: 4,758,413

[45] Date of Patent: Jul. 19, 1988

[54] REACTIVE RESINS USEFUL FOR PRECIOUS METAL RECOVERY

[75] Inventors: William I. Harris; James R. Stahlbush, both of Midland, Mich.

[73] Assignee: The Dow Chemical Company, Midland, Mich.

[21] Appl. No.: 931,322

[22] Filed: Nov. 17, 1986

[51] Int. Cl.$^4$ ............................................... C01G 7/00
[52] U.S. Cl. ........................... 423/24; 423/DIG. 14; 75/101 BE; 75/118 R; 210/673; 210/684; 210/688
[58] Field of Search .................. 423/22, 24, DIG. 14; 75/101 BE, 118 R, 121; 210/660, 670, 673, 684

[56] References Cited

U.S. PATENT DOCUMENTS 2,839,389  6/1958  Kember et al. ..................... 423/24

FOREIGN PATENT DOCUMENTS 3503497  8/1986  Fed. Rep. of Germany ........ 423/24

OTHER PUBLICATIONS

Aueston, et al "Recovery of Gold, Silver and Nickel from Alkaline Cyanide Solutions by Means of Weak-Base Ion-Exchange Resins" J. of Appl. Chem., Feb. 8, 1958, pp. 77–86.

*Primary Examiner*—Robert L. Stoll
*Attorney, Agent, or Firm*—Mathew S. Goodwin

[57] ABSTRACT

An improved process for the recovery of precious metal values is disclosed. By this process precious metals in the form of anionic complexes are contacted with a weak-base anion exchange resin capable of complexing with the anionic complex. Such weak-base anion exchange resins contain weak-base functionalities derived from linear or cyclic polyaminoalkylene amines which have more than 1 amine moiety and at least 3 carbon atoms in a 1,X-alkylene moiety or moieties separating at least 1 amine moiety from a second amine moiety (i.e., X is an integer greater than 2).

33 Claims, No Drawings

REACTIVE RESINS USEFUL FOR PRECIOUS METAL RECOVERY

BACKGROUND OF THE INVENTION

This invention relates to a process for employing ion exchange resins suitable for absorbing precious metal ions, particularly gold ions from aqueous solutions.

By the practice of the Merril-Crow process, precious metals are conventionally extracted from ore by grinding the ore to a fine powder in a water slurry and leaching the metal from the ore with a cyanide and oxygen mixture. The resulting metal cyanide complex, which is soluble in water, is obtained as a filtrate as the ore is collected. The metal laden filtrate is then reduced using zinc metal. The metal which is recovered can be smelted and purified.

Precious metals can also be recovered by providing a metal cyanide complex as described hereinbefore and adsorbing the complex on activated carbon. The loaded carbon can be screened from the pulp or leach stream and the metal recovered from the carbon by an electroelution in hot caustic/cyanide solution. The metal can then be smelted and purified. A carbon-in-pulp process eliminates expensive filtration and clarification equipment required in the Merril-Crow process.

Although the aforementioned processes provide a means for recovering precious metals from ores, it is desirable to provide improved processes for such recovery. In particular, it would be desirable to provide a process for recovering precious metals which does not require expensive filtration/clarification equipment, utilizes an ion exchange resin which is substantially resistant to fouling, can easily be eluted and regenerated, is highly selective, and is capable of providing recovery of precious metals in high yield.

Processes for the recovery of gold and other precious metal values from ores using ion exchange resins are described in U.S. Pat. No. 2,648,601; Green, B. R. and Potgeiter, A. H., Council for Mineral Technology, South Africa, "Unconventional Weak-Base Anion Exchange Resins, Useful for the Extraction of Metals, Especially Gold", *Ion Exchange Technology*, D. Naden and M. Streat, eds., London Society Chemical Industry, 1984; Fleming, C. A., Council for Mineral Technology, South Africa, "Some Aspects of the Chemistry of Carbon-in-Pulp and Resin-in-Pulp Processes", the Aus. I.M.M. Perth and Kalgoorlie Branches and Murdoch University, Carbon-In-Pulp Seminar, July, 1982; and Mehmet, A. and Te Riele, W.A.M., Council for Mineral Technology, South Africa, "The Recovery of Gold from Cyanide Liquors in a Counter-Current Contactor Using Ion Exchange Resin", *Ion Exchange Technology*, D. Naden and M. Streat, eds., London Society Chemical Industry, 1984. The conventional ion exchange processes for recovery of precious metals involve dissolving the metal values by cyanidization, providing a solution in a slightly basic pH range, sorbing the dissolved values on a resinous weak-base anion exchanger, separating the exchanger from solution, and desorbing the values from the exchanger at a pH range of about 13 to 14. A limitation of the disclosed processes arises due to the fact that typical mine streams operate at a pH of about 10 to about 11. At such high pH values, the conventional weak-base resins, disclosed in the aforementioned references, do not attain a high loading capacity or are not chemically stable at such pH values. The prior art generally avoids the loading problem by lowering the pH value of the mine streams.

In view of the deficiencies of the prior art, it would be highly desirable to provide an improved process for recovering precious metals from aqueous solution at a relatively high pH range. The process is advantageously effective and efficient, and if an ion exchange resin is employed, the resin should be easily and efficiently regenerated.

SUMMARY OF THE INVENTION

The present invention is an improved process for recovering precious metal values. In this method at least one precious metal value in the form of an anionic complex in an aqueous medium is contacted with a weak-base anion exchange resin under conditions such that the weak-base groups of the anion exchange resin can complex with precious metal values and then the precious metal vaues are recovered from the anion exchange resin. The improvement comprises employing as the weak-base anion exchange resin a polymer matrix comprising weak-base functionalities attached to the polymer matrix through a nitrogen atom of a polyaminoalkylene amine functionality, wherein at least 2 amino moieties are separated by a 1,X-alkylene, wherein X is an integer greater than 2.

In the process of this invention, the weak-base ion exchange resins exhibit higher pKa values than conventional weak-base ion exchange resins. By the term pKa is meant the pH at which one-half of the metal cyanide complex in solution is loaded onto the resin (see Example 3, Table 3). Such high pKa's are desirable since optimal loading of the resins is obtained when the pH of the leach liquor containing the precious metal values is less than or equal to the pKa of the resin. Typically, leach liquors are alkaline in nature. Resins with high pKa's permit extraction of precious metals from the alkaline liquor without the need to lower the pH of the liquor stream. Compared to conventional weak-base ion exchange resins, the present weak-base ion exchange resins provide a surprisingly high capacity for loading precious metals such as gold. Also, precious metals can be easily eluted and the resin conveniently regenerated, thus, providing an improved process for recovering precious metal values.

The process provides a means for increasing recovery of precious metals, such as gold, in various separation systems such as fluidized beds or stirred tank reactors. Densified weak-base anion exchange resins exhibit a surprisingly high capacity for loading precious metals such as gold, and the selectivity of loading such a resin is significantly increased as compared with conventional ion exchange resins.

DETAILED DESCRIPTION OF THE INVENTION

Copolymer particles useful in this invention are most advantageously those prepared from suspension polymerizable ethylenically unsaturated monomers. Suitable copolymer particles and methods of preparation of such are disclosed in U.S. Pat. Nos. 4,444,961; 3,716,482; 3,549,562; 4,382,124; 4,104,209; 4,419,245, 3,418,262 and G. B. Pat. No. 1,050,207; which are incorporated herein by reference. Preferred copolymer particles are those prepared from styrene and divinylbenzene.

The copolymer particles are haloalkylated using generally known techniques to provide a polymer matrix useful in this invention. Such methods for haloalkylating copolymer particles, haloalkylating agents, and the like are disclosed in U.S. Pat. Nos. 2,642,417; 2,960,480; 2,597,492; 2,597,493; 3,311,602 and 2,616,817, as well as *Ion Exchange* by F. Helfferich, published in 1962 by McGraw Hill Book Co., New York.

In one preferred embodiment, the anion exchange resins employed in the method of this invention may be subjected to conditions which result in an increase in the density of the resin. High density anion exchange resins can be employed in fluidized beds in the process of this invention to increase production of precious metals, such as gold, from clarified streams. Such increased density resins are desirable in that a resin having increased density is able to withstand faster flow rates during use in an exchange column without having resin particles becoming entrained in the fluid upflow. Further, in unclarified liquor streams, the use of high density resins is advantageous due to the reduced amount of mixing necessary in stirred tank processes.

The polyaminoalkylene amines useful for providing the weak-base functionalities in this invention have more than one amine moiety and at least three carbon atoms in a 1,X-alkylene moiety or moieties separating at least one amine moiety from a second amine moiety (i.e., X is an integer greater than 2) and can be represented by the general formula

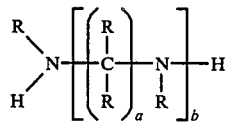

wherein R, at each occurrence, is independently hydrogen, alkyl, alkylene amine, alkylene hydroxide or alkylene sulfide, "a", at each occurrence, is independently an integer greater than or equal to 2, preferably from 3 to about 12, more preferably from 3 to about 6; and "b" is at least one, preferably from 1 to about 3, with the proviso that at least one "a" is greater than 2. Preferably, R is hydrogen or methyl. The 1,X-alkylene moieties separating the amine moieties may be similar or different at each occurrence with 1,3-alkylenes being preferred. Examples of suitable polyaminoalkylene amine compounds of this invention include 1,3-diaminopropane, 3,3'-iminobispropylamine, 1,4-diaminobutane, 1,6-diaminohexane, 2,4-diamino-2-methylpentane, 3,3'-diamino-N-methyl dipropylamine, 1,5-diamino-2-methylpentane and the like.

Other useful polyaminoalkylene amines include cyclic amines which have more than one amine moiety and at least three carbon atoms separating at least one amine moiety from a second amine moiety and can be represented by the general formula:

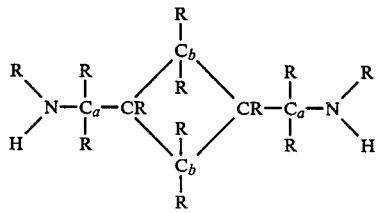

wherein R, at each occurrence, is independently hydrogen, alkyl, alkylene amine, alkylene hydroxide or alkylene sulfide, "a", at each occurrence, is independently 0 or a positive integer, preferably from 0 to about 3; "b", at each occurrence, is independently an integer greater than zero, preferably from 1 to about 3. Preferably, R is hydrogen or methyl. Examples of these types of polyaminoalkylene amine compounds of this invention include 1,3-diamino cyclohexane, 1,4-diamino cyclohexane and the like.

Useful cyclic amines may also include those which contain one amine moiety within the cyclic group. Such amines have at least three carbon atoms separating at least one amine moiety from a second amine moiety and can be represented by the general formula:

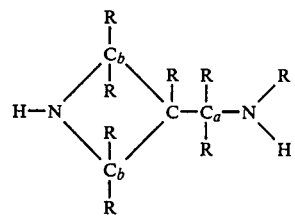

wherein R, at each occurrence, is as previously described, "a" is the same as previously described and "b" is as previously described, with the proviso and when "a" is 0 at least one of "b" is an integer greater than 1. Examples of these types of cyclic amines include 4-aminopiperidine and 4-amino-2,2,6,6-tetramethylpiperidine, and the like.

The cyclic amines may also contain two amine moieties within the cyclic group with at least three carbon atoms separating at least one amine moiety from a second amine moiety and can be represented by the general formula

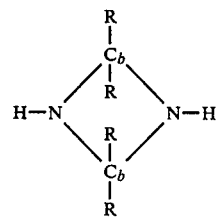

wherein R, at each occurrence, is as previously described, and "b" at each occurrence is independently an integer greater than 0 with the proviso that at least one of "b" is greater than 2. Examples of these types of cyclic amines include homopiperazine and the like.

The polyaminoalkylene amine functional resins of this invention exhibit a combination of properties (such as high weak-base capacity and resistance to oxidation) which are superior to resins prepared from 1,2-alkylene amines. The resins have excellent wet volume capabilities, dry weight capacities and operating capacities. In addition, the weak-base resins of this invention exhibit fairly high densities and low swelling values upon conversion from the free-base form to acid form in the resin.

It is desirable to have sufficient amine functionality such that the resin which is produced does not have a low weak-base capacity. Thus, in preparing the ion exchange resin, it is preferable to employ a reaction mixture comprising at least one amine functionality per haloalkylated functionality, more preferably greater than about 1.3 amine functionalities per mole of haloalkylated functionality. For example, if 1,3-diaminopropane and polymerized benzyl chloride functionalities are contacted, it is most desirable to employ at least 0.5 moles of 1,3-diaminopropane per mole of benzyl chloride functionality.

The process for preparing the weak-base anion exchange resins involves dispersing the polymer matrix (e.g., haloalkylated copolymer particles) in the polyamine, either neat or with a diluent or solvent. The mixture is subjected to reaction conditions such as heating for the reaction time required to achieve the desired degree of reaction. The temperature of the mixture before reaction is conveniently in the range from about 0° to about 100° C., preferably from about 25° to about 70° C.; while the temperature of the mixture during reaction is advantageously in the range from about 0° to about 150° C., preferably about 40° to about 110° C. The reaction time can vary dependent upon reactants, reaction temperature, diluents and other factors, but typically ranges from about 5 minutes to about 3 days, preferably about 1 to about 5 hours. The mixture is cooled and the resin is washed. Caustic or soda ash can be added to the reaction mixture in order to neutralize acids such as hydrochloric acid which can be generated during reaction. Typically, the amount of caustic which is employed ranges from about 0 to about 1.2 moles per mole of haloalkylated functionality. If desired, the resin can be converted to free base form during washing using a basic material such as caustic, soda ash or ammonia.

The resins useful in this invention can be densified by impregnating them with various insoluble sulfide, sulfate, oxides or carbonate metal compounds such as barium sulfate, lead sulfate or lead sulfide. Such impregnation is accomplished by precipitating the insoluble metal compound within the resin in amounts sufficient to measurably increase the density thereof. One method of densifying ion exchange resins is disclosed in U.S. Pat. No. 4,477,597, which is incorporated herein by reference. Typically, the densified resins have a density ranging from about 1 to about 1.5 g/ml. Such densified resins are particularly useful in fluidized beds where resin carry-over is a concern. Also, in stirred-tank processes the high density resins reduce the amount of mixing necessary compared to systems utilizing conventional resins.

The precious metals in the form of ions in an aqueous medium can be derived from a variety of sources. For example, gold can be present from gold ore in process streams; from electronic devices; from jewelry, dental items, and related items; from plating solutions, such as rinse baths; from slime recovery; from heap leaching; and the like.

The precious metal is prepared as the preferred anionic cyanide complex by contacting the precious metal containing solution with sodium cyanide in an amount sufficient ot provide a precious metal cyanide anion (e.g., $Au(CN)_2^-$). Typically, such a complex is prepared at a basic pH. The preparation of such a complex is disclosed in U.S. Pat. No. 2,648,601, which is incorporated herein by reference.

The aqueous medium comprising the precious metal cyanide complex is contacted with the weak-base anion exchange resin under conditions such that the weak-base groups of the anion exchange resin can complex with the metal cyanide complex. This contact can occur by any conventional technique, e.g., a resin-in-pulp, fluidized bed, fixed bed, stirred tank or continuous counter-current column. The preferred method employs a stirred tank reactor. The aqueous medium can be contacted with the resin using upward flow, downflow, counter-current flow and other convenient techniques. Flow rates and concentration of the aqueous medium and ion exchange resin volume depend upon factors such as kinetics, capacity and economics and can be determined empirically or by standard engineering procedures.

Flow rates generally range between very small amounts to about 250 tons of aqueous solution per hour depending on the size of the mining operation. The concentration of gold values present in the raw liquor stream typically ranges from about 0.5 to about 12 ppm in solution. By the process of this invention, the concentration of gold is desirably reduced to an amount ranging from about 2 to about 10 ppb of gold in solution. The amount of resin employed in the practice of this invention ranges from about 3 to about 8 percent by volume based on the volume of the stirred tank.

The contacting of the anionic complex and the ion exchange resin is generally carried out at a pH ranging from about 8 to about 13, preferably from about 10 to about 11. The pH is typically a value at or below the pKa of the resin to promote gold absorption by the resin. The temperature during contact between the resin and solution is advantageously in the range from about 40° to about 0° C. Ambient temperatures are preferred to reduce the need for heating or cooling elements. The optimum period of contact of the resin with the aqueous solution of anionic complexed precious metal values will vary depending on the resin, method of contact and other factors. Typically, contact for a period of time ranging from about 1 to about 72 hours is preferred with about 24 to about 48 hours being most preferred.

The weak-base anion exchange resin is not generally allowed to be loaded to its maximum capacity during operation. The preferred resin loading is determined by resin kinetics, plant economics, and other factors.

The precious metal values removed from the aqueous stream may be recovered from the resin by contacting the resin with a strongly alkaline solution, such as caustic, under conditions which result in a basic hydrolysis of the resin. The conditions under which the caustic elution is carried out are generally those which result in the conversion of the resin's functional group to the free-base form in which they are no longer able to complex with the anion. The contact of the caustic and the ion exchange resin may be conveniently carried out at ambient temperatures and pH's ranging from about 10 to about 14. The caustic which is employed may be of varying concentration ranging from about 0.5M to about 1.0M. A sufficient amount of caustic is employed in order to efficiently elute the metal values from the resin. The amount of time in which the resin and caustic are contacted depends upon the desired percentage of metal values recovered and the concentration of caustic employed.

Other methods of eluting metal values are available and include an ion exchange type reaction. An anion is chosen that is absorbed onto the weak-base resin more strongly than the metal value complex anion. Such anion is contacted with the complexed weak-base anion exchange resin under conditions which result in the release of the metal value complex and an absorption of the other anion. Such process results in the need of an additional step to regenerate the resin before its recycle to an absorption stage. Thus, the caustic method of elution is more efficient and is also simpler and cheaper in practice.

The contacting of the resin with the strongly alkaline solution may be accomplished by a variety of methods as discussed previously in regard to the contacting of the aqueous medium and the weak-base anion exchange resin. Examples of such methods include fluidized beds, fixed beds, stirred tanks or a continuous counter-current column.

The metal values eluted from the resin and recovered may be further processed to obtain precious metal or useful precious metal compounds by electrolytic methods or other conventional processes. Similarly, other metal values may be recovered from aqueous stream and converted into useful compounds.

The following examples are presented to further illustrate but not otherwise limit the scope of this invention. All parts and percentages are by weight unless otherwise indicated.

EXAMPLE 1

A macroporous chloromethylated copolymer is prepared using the procedures similar to those described in British Pat. No. 1,050,207. The copolymer is prepared employing divinylbenzene and styrene monomers in an isooctane diluent. The chloromethylation with a monochloro-dimethyl ether is carried out in the presence of a ferric chloride catalyst at a temperature of 58° C. The resulting product is isolated and washed with methanol and is found to contain 26.1 percent chlorine by weight.

To 500 g of 1,3-diaminopropane at a temperature of 66° C. is added 49.3 g of the dry chloromethylated copolymer. The temperature of the mixture increases to 82° C. within 10 minutes and is held at 80° C. for an additional 115 minutes. The solution is cooled and washed with water, then with 1N NaOH, and then backwashed with water. The product is designated as Sample No. 1.

Sample Nos. 2, 3 and 4 are prepared in a similar fashion utilizing 1,3-diaminopropane, 3,3'-iminobispropylamine and 2,4-diamino-2-methylpentane, respectively, as the source of the amine functionality. Samples 2 and 3 are impregnated with barium sulfate and lead sulfate by the method of Example 2, Methods I and II. Sample No. 5 is prepared in a similar fashion as discussed above utilizing 3,3'-iminobispropylamine as the source of the amine functionality. Unlike Sample No. 3, Sample No. 5 is not impregnated with lead sulfate. Sample No. 6 is the 1,3-diaminopropane functionalized resin of Sample No. 1, which has been impregnated with lead sulfate. The above is summarized in Table I.

TABLE I

| Sample | Polyaminoalkylene Amine Moiety | Densifying Compound |
|---|---|---|
| 1 | 1,3-diaminopropane | — |
| 2 | 1,3-diaminopropane | BaSo4 |
| 3 | 3,3'-iminobispropylamine | PbSO4 |
| 4 | 2,4-diamino-2-methylpentane | — |
| 5 | 3,3'-iminobispropylamine | — |
| 6 | 1,3-diaminopropane | PbSO4 |

EXAMPLE 2

Method I

At ambient temperatures, a slurry of 50 mls of the resin designated Sample No. 1 in Example 1 (in the free-base form) in 150 ml of deionized water is prepared. To the slurry is added 37.5 ml of 20 percent sulfuric acid. The mixture is allowed to sit for one hour. The excess acid is decanted, and the resin is washed with deionized water. The resin is then immersed in 100 ml of a saturated aqueous barium chloride solution for a period of one hour. The resin is then washed in deionized water and subsequently neutralized in a slurry containing 30 ml of 8N NaOH in 200 ml of deionized water. In order to further remove excess NaOH and loose barium sulfate precipitate, the resin is backwashed with deionized water. The above procedure is repeated in order to further increase the density.

Method II

The ambient temperatures, a slurry of 11.5 ml of the resin designated Sample No. 1 in Example 1 in the free-base form is stirred with 25 ml of 20 percent aqueous $Pb(NO_3)_2$ solution for 30 minutes. The mixture is allowed to stand overnight. Excess $Pb(NO_3)_2$ is removed by filtering the resin and then washing the resin with water. The resin is then immersed in 100 ml of water and two additions of 2 ml of 20 percent $H_2SO_4$ are added to the mixture with a water wash between the additions. The resin is then backwashed to remove free $PbSO_4$. The results are reported in Table II.

TABLE II

| | | | Density g/ml | |
|---|---|---|---|---|
| Sample | Precipitate | Method | Before Densification | After Densification |
| 1 | BaSO4 | I | 1.06 | 1.14 |
| 1 | PbSO4 | II | 1.08 | 1.32 |
| 1 | PbS | II | 1.06 | 1.30 |
| 4 | BaSO4 | I | 1.04 | 1.31 |

The data in Table II illustrates that both Methods I and II are effective procedures to increase the density of Samples 1 and 4.

EXAMPLE 3

A stock gold solution is prepared by dissolving 1.56 grams (g) of gold chloride which is 50 percent gold by weight and 1.56 g of sodium cyanide in 1 liter of deionized water. Five milliliters of this solution is added to an 8 oz. glass bottle containing 0.1 g of a resin prepared in a manner as in Example 1 and 150 g of deionized water. The pH of the bottle contents is adjusted by addition of hydrochloric acid and/or sodium hydroxide. The bottle is placed on an Eberback Shaker and left to equilibrate. The pH is allowed to stabilize for about 48 hours and is readjusted if necessary. The sample is analyzed for gold by atomic absorption. Data is presented in Table III.

TABLE III

| Sample | pH | Gold in Solution (g/ml) | Gold in Resin µg/g |
|---|---|---|---|
| 1 | 5.41 | 0.1 | 39283 |
| | 7.35 | 0.2 | 38390 |
| | 8.70 | 1.6 | 36531 |
| | 9.08 | 2.2 | 36516 |
| | 10.30 | 7.9 | 26456 |
| | 11.88 | 20.4 | 7991 |
| 2 | 5.73 | 0.1 | 39631 |
| | 6.01 | 0.1 | 39639 |
| | 8.72 | 1.1 | 37469 |
| | 9.22 | 3.2 | 34103 |
| | 10.14 | 7.8 | 27241 |
| | 12.02 | 18.0 | 11793 |
| 3 | 5.37 | 0.1 | 39753 |
| | 7.15 | 0.3 | 39133 |
| | 9.93 | 6.5 | 29689 |
| | 10.59 | 10.6 | 23382 |

TABLE III-continued

| Sample | pH | Gold in Solution (g/ml) | Gold in Resin μg/g |
|---|---|---|---|
| | 11.40 | 16.4 | 14266 |
| | 12.80 | 23.1 | 4229 |
| 4 | 5.40 | 0.1 | 42871 |
| | 6.85 | 0.1 | 40444 |
| | 9.35 | 1.8 | 40916 |
| | 10.95 | 12.4 | 24721 |
| | 11.35 | 15.8 | 19216 |
| | 11.55 | 18.2 | 15831 |
| | 12.45 | 22.5 | 9096 |
| | 13.1 | 24.8 | 5648 |

The data in Table III illustrates that the method of this invention is operable even when the solution of cyanide complex contains low concentrations of gold in solution and large amounts of gold in the resin at a high pH. Further, these resins can be regenerated at a relatively high pH.

EXAMPLE 4

A metal stock solution containing 0.005M of each metal is prepared by the addition of the following to a 0.075M aqueous solution of sodium cyanide, gold (dissolved as $HAuCl_4$), silver (dissolved as $AgNO_3$), copper (dissolved as $CuCl_2$), zinc (dissolved as $Zn(NO_3)_2 \cdot 6H_2O$), nickel (dissolved as $NiSO_4 \cdot 6H_2O$) and cobalt (dissolved as $CO(NO_3)_2 \cdot 6H_2O$). Fifteen milliliters of this solution is added to each of three 8 oz glass bottles containing 0.1, 0.3, and 0.5 g of resins as prepared in accordance with Examples 1 and 2 and 135 g of deionized water. HCl and/or NaOH is added to adjust the pH to just below the pKa of each resin. The bottles are placed on an Eberback shaker and allowed to equilibrate. Once the pH has stabilized, the metal concentration of each solution is determined using the inductively coupled argon plasma technique. The gold and silver are analyzed by atomic absorption. The selectivity data for each metal is presented in Table IV.

TABLE IV

| Sample | GMS Resin | pH | Metal Concentration μg/ml Solution | | | | | |
|---|---|---|---|---|---|---|---|---|
| | | | Co | Ni | Zn | Cu | Ag | Au |
| C-1* | 0 | — | 28 | 26 | 33 | 31 | 56 | 67.1 |
| 1 | 0.1 | 10.1 | 24 | 26 | 28 | 30 | 53 | 66.4 |
| | 0.3 | 10.1 | 19 | 24 | 22 | 31 | 51 | 51.0 |
| | 0.5 | 9.9 | 17 | 20 | 14 | 30 | 46 | 32.7 |
| C-4* | 0 | 9.9 | 26 | 25 | 27 | 25 | 32.4 | 97.1/82.6 |
| | 0 | 9.9 | 27 | 26 | 29 | 29 | 31.7 | 98.1/80.8 |
| 4 | 0.1 | 9.7 | 26 | 24 | 22 | 29 | 29.9 | 62.5/54.2 |
| | 0.2 | 9.9 | 24 | 18 | 12 | 28 | 26.1 | 28.4/17.4 |
| | 0.3 | 10.0 | 21 | 13 | 6 | 26 | 17.7 | 13.9/7.4 |
| 5 | 0.1 | 9.7 | 26 | 25 | 25 | 29 | 30.4 | 76.8/56.0 |
| | 0.2 | 9.7 | 24 | 23 | 17 | 28 | 28.6 | 48.5/30.7 |
| | 0.3 | 9.9 | 23 | 21 | 12 | 27 | 26.4 | 31.5/23.2 |

*Not an example of the invention.

The data in Table IV illustrates that the samples of this invention (i.e., Samples 1, 4 and 5) selectively complex with gold in perference to most base metals.

EXAMPLE 5

A metal stock solution is prepared by dissolving 1.56 g of $HAuCl_4$ (50 percent Au by weight) and 1.56 g of sodium cyanide in one liter of deionized water. Ten milliliters of this solution are added to each of five 8 oz. glass bottles containing 1.0, 0.3, 0.5, 0.7, and 0.9 g of resin (HCL form) and 150 g of deionized water. The pH of Sample Nos. 1 and 2 solutions is adjusted to between 7.5 and 8.5 using sodium hydroxide and hydrochloric acid. The pH of Sample No. 6 is adjusted to between 10.0 and 10.2 using sodium hydroxide and hydrochloric acid. The bottles are placed on an Eberback shaker, pH's are monitored and adjusted daily until the pH's are stabilized for at least 48 hours. Once equilibrated, 15 mls. of solution is withdrawn from each bottle and analyzed for gold by atomic absorption. The equilibrium loading data is presented in Table V.

TABLE V

| Sample | pH | Gold in Solution μg/ml Grams of Resin | | | | | |
|---|---|---|---|---|---|---|---|
| | | 0 | 0.1 | 0.3 | 0.5 | 0.7 | 0.9 |
| Blank | 7.5–8.5 | 48.6/49.0 | — | — | — | — | — |
| 1 | 7.5–8.5 | — | 7.2 | 0.4 | 0.1 | 0.1 | 0.1 |
| 2 | 7.5–8.5 | — | 8.0 | 0.5 | 0.1 | 0.1 | 0.1 |
| 6 | 10.0–10.2 | — | 25.9 | 4.7 | 2.0 | 0.8 | 0.7 |

The data in Table V illustrates that Sample Nos. 1 and 2 complex with most of the gold present in solution at a pH of 7.5 to 8.5. Conventional resins tend to exhibit a lower loading capacity as the pH increases. In Sample No. 6, the resin is shown to exhibit a similar type of loading capacity at a high pH (10.0–10.2).

EXAMPLE 6

1.5 g of a resin prepared as in Example 1 is introduced into an 8 oz. glass bottle. The bottle is filled with deionized water. The pH is adjusted to the pH at which kinetic loading is to be done. The pH is monitored and readjusted until it is stabilized for at least 48 hours. After the pH is stabilized, the water is decanted.

2.5 Liters of an aqueous gold cyanide solution with 10 ppm of gold is added to a one-gallon glass bottle. The pH of the mixture is adjusted to that desired in the kinetics study.

To determine the initial gold concentration 15 ml aliquot of the aqueous gold cyanide solution is withdrawn before adding the resin to the one-gallon glass bottle. After adding the resin to the gold cyanide solution, it is agitated on a roller. The mixture is removed from the roller and 15 ml aliquot is withdrawn at time intervals of 15 minutes, 30 minutes, 60 minutes, 90 minutes, 3 hours, 5 hours and 24 hours.

The sampled solutions are analyzed for gold content. The kinetic data is presented in Table VI.

TABLE VI

| Sample | pH | Gold in Solution μg/ml Time (min.) | | | | | | | |
|---|---|---|---|---|---|---|---|---|---|
| | | 0 | 15 | 30 | 60 | 90 | 180 | 300 | 1440 |
| 1 | 10.2 | 9.2 | 7.7 | 7.1 | 5.5 | 4.5 | 3.1 | 2.2 | 1.0 |
| 4 | 10.2 | 9.8 | 7.5 | 7.0 | 5.2 | 4.2 | 2.7 | 1.8 | 0.7 |
| 5 | 10.2 | 10.0 | 8.2 | 7.6 | 5.6 | 4.5 | 3.2 | 2.0 | 0.7 |

The data in Table VI illustrates that Samples 1, 4 and 5, all exhibit fast gold uptake and adsorption of more than 80 percent of the gold from the solution after 1440 minutes.

What is claimed is:

1. A method of adsorbing an anionic complex of a precious metal from an aqueous medium at a pH from about 8 to about 13 onto an anion exchange resin wherein the absorbed anionic complex can be eluted from the resin with a caustic solution under conditions sufficient to convert the resin to the free-base form, comprising the step of contacting the aqueous medium with a weak-base anion exchange resin functionalized with a polyaminoalkylene amine wherein 1,X-alkylene bridges at least two amino moieties, provided X is an integer greater than 2.

2. The method of claim 1, wherein said precious metal is gold.

3. The method of claim 2, wherein said anionic complex is a cyanide complex.

4. The method of claim 1, wherein the pKa of the weak-base anion exchange resin is greater than or equal in value to the pH of the aqueous medium.

5. The method of claim 1, wherein the contacting of the aqueous medium with a weak-base anion exchange resin takes place in a system comprising a resin-in-pulp system.

6. The method of claim 2 further comprising recovering precious metal anion complexes from the anion exchange resin by contacting the resin with an effective amount of an alkaline solution under conditions effective to regenerate the resin and elute precious metal complex anion complexes.

7. The method of claim 6, wherein the alkaline solution is caustic.

8. The method of claim 1, wherein said polyaminoalkylene amine is represented by the general formula:

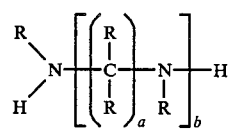

wherein R, at each occurrence, is independently hydrogen, alkyl, alkylene amine, alkylene hydroxide or alkylene sulfide, "a", at each occurrence, is independently an integer greater than or equal to 2 and "b" is at least 1, with the proviso that at least 1 of "a" is greater than 2.

9. The method of claim 1, wherein the polyaminoalkylene amine is represented by the general formula:

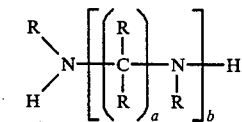

wherein R, at each occurrence, is independently hydrogen, alkyl, alkylene amine, akylene hydroxide or alkylene sulfate, "a", at each occurrence, is independently an integer from about 3 to about 12 and "b" is an integer from 1 to about 3.

10. The method of claim 1, wherein the polymer matrix of the anion exchange resin comprises a copolymer of styrene and divinylbenzene.

11. The method of claim 8, wherein said polyaminoalkylene amine is 1,3-diaminopropane.

12. The method of claim 8, wherein said polyaminoalkylene amine is 1,4-diaminobutane.

13. The method of claim 8, wherein said polyaminoalkylene amine is 1,6-diaminohexane.

14. The method of claim 8, wherein said polyaminoalkylene amine is 2,4-diamino-2-methylpentane.

15. The method of claim 8, wherein said weak-base anion exchange resin has been impregnated with an effective amount of a metal sulfide, a metal sulfate, a metal oxide, or a metal carbonate sufficient to increase the density of said resin.

16. The method of claim 15, wherein said metal sulfate is barium sulfate.

17. The method of claim 15, wherein said metal sulfate is lead sulfate.

18. The method of claim 15 wherein said metal sulfide is lead sulfide.

19. The method of claim 15, wherein said weak-base anion exchange resin has a density ranging from about 1.1 to about 1.5 g/ml.

20. The method of claim 1, wherein said polyaminoalkylene amine is bonded to the polymer matrix of the anion exchange resin through an amine group.

21. The method of claim 1, wherein the contacting of the aqueous medium with a weak-base anion exchange resin takes place in a fixed bed system.

22. The method of claim 1, wherein the 1,X-alkylene moiety is a 1,3-alkylene moiety.

23. The method of claim 1, wherein said polyaminoalkylene amine is represented by the general formula

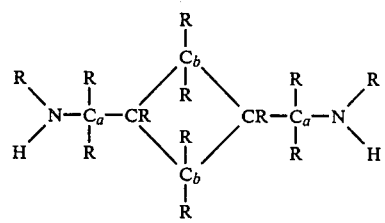

wherein R, at each occurrence, is independently hydrogen, alkyl, alkylene amine, alkylene hydroxide or alkylene sulfate, "a", at each occurrence, is independently 0 or a positive integer and "b", at each occurrence, is independently an integer greater than 0.

24. The method of claim 23 wherein said polyaminoalkylene amine is 1,4-diamino cyclohexane.

25. The method of claim 23 wherein said polyaminoalkylene amine is 1,3-diamino cyclohexane.

26. The method of claim 1, wherein said polyaminoalkylene amine is represented by the general formula

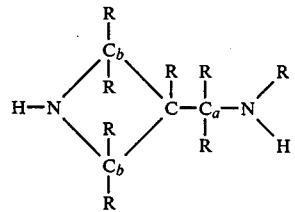

wherein R, at each occurrence, is independently hydrogen, alkyl, alkylene amine, alkylene hydroxide or alkylene sulfate, "a" is independently 0 or a positive integer and "b", at each occurrence, is independently an integer greater than 0, with the proviso that when "a" is 0 at least one of "b" is an integer greater than 1.

27. The method of claim 26 wherein the polyaminoalkylene amine is 4-aminopiperidine.

28. The method of claim 26, wherein the polyaminoalkylene amine is 4-amino-2,2,6,6-tetramethylpiperidine.

29. The method of claim 1, wherein said polyaminoalkylene amine is represented by the general formula:

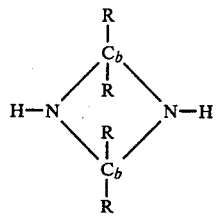

wherein R, at each occurrence, is independently hydrogen, alkyl, alkylene amine, alkylene hydroxide and alkylene sulfate; "b", at each occurrence, is independently an integer greater than 0 with the proviso that at least one of "b" is greater than 2.

30. The method of claim 29, wherein said polyaminoalkylene amine is homopiperazine.

31. The method of claim 8, wherein said polyaminoalkylene amine is 1,5-diamino-2-methylpentane.

32. The method of claim 8, wherein said polyaminoalkylene amine is 3,3'-diamino-N-methyl dipropylamine.

33. The method of claim 8, wherein said polyaminoalkylene amine is 3,3'-iminobispropylamine.

* * * * *

UNITED STATES PATENT AND TRADEMARK OFFICE
CERTIFICATE OF CORRECTION

PATENT NO. : 4,758,413

DATED : July 19, 1988

INVENTOR(S) : William I. Harris; James R. Stahlbush

It is certified that error appears in the above-identified patent and that said Letters Patent is hereby corrected as shown below:

Column 9, line 49, in Table IV, in the column entitled GMS Resin "0.2" should correctly appear as --0.3--;

Column 9, line 50, in Table IV, in the column entitled GMS Resin "0.3" should correctly appear as --0.5--;

Column 9, line 52, in Table IV, in the column entitled GMS Resin "0.2" should correctly appear as --0.3--;

Column 9, line 53, in Table IV, in the column entitled GMS Resin "0.3" should correctly appear as --0.5--;

Signed and Sealed this

Seventeenth Day of March, 1992

Attest:

HARRY F. MANBECK, JR.

*Attesting Officer*      *Commissioner of Patents and Trademarks*